United States Patent
Suzuki et al.

(10) Patent No.: US 7,199,977 B2
(45) Date of Patent: Apr. 3, 2007

(54) MAGNETIC RECORDING DISK HAVING A TRANSITION ZONE

(75) Inventors: Shoji Suzuki, San Jose, CA (US); Henry S. Nishihira, San Jose, CA (US)

(73) Assignee: Komag, Inc., San Jose, CA (US)

( * ) Notice: Subject to any disclaimer, the term of this patent is extended or adjusted under 35 U.S.C. 154(b) by 217 days.

(21) Appl. No.: 10/701,059

(22) Filed: Nov. 3, 2003

(65) Prior Publication Data

US 2004/0174636 A1 Sep. 9, 2004

Related U.S. Application Data

(63) Continuation-in-part of application No. 10/382,635, filed on Mar. 5, 2003.

(51) Int. Cl.
*G11B 5/82* (2006.01)
(52) U.S. Cl. ..................................................... 360/135
(58) Field of Classification Search ..................... None
See application file for complete search history.

(56) References Cited

U.S. PATENT DOCUMENTS

| | | | |
|---|---|---|---|
| 5,377,058 A | 12/1994 | Good et al. | |
| 5,644,451 A * | 7/1997 | Chan et al. | 360/254.8 |
| 5,673,156 A | 9/1997 | Chen et al. | |
| 5,798,164 A | 8/1998 | Weiss et al. | |
| 5,870,250 A | 2/1999 | Bolasna et al. | |
| 5,870,265 A * | 2/1999 | Boutaghou | 360/135 |
| 5,875,083 A | 2/1999 | Oniki et al. | |
| 6,020,045 A | 2/2000 | Chen et al. | |
| 6,057,984 A | 5/2000 | Arita et al. | |
| 6,075,683 A | 6/2000 | Harwood et al. | |
| 6,139,936 A | 10/2000 | Weiss | |
| 6,330,124 B1 | 12/2001 | Tsukamoto et al. | |
| 6,351,345 B1 * | 2/2002 | Kameyama | 360/236.3 |
| 6,381,090 B1 | 4/2002 | Suzuki et al. | |
| 6,473,259 B1 | 10/2002 | Kuo et al. | |
| 6,529,347 B2 | 3/2003 | Hipwell et al. | |
| 6,563,673 B2 | 5/2003 | Mundt et al. | |
| 6,597,539 B1 | 7/2003 | Stupp et al. | |
| 2002/0024774 A1 | 2/2002 | Berger et al. | |
| 2002/0030937 A1 | 3/2002 | Liu | |
| 2002/0181153 A1 | 12/2002 | Kang | |

FOREIGN PATENT DOCUMENTS

WO WO02/19330 A1 3/2002

(Continued)

OTHER PUBLICATIONS

Patent Abstracts of Japan, Publication No. 11-273061, Aug. 10, 1999.

(Continued)

*Primary Examiner*—R. S. Tupper
(74) *Attorney, Agent, or Firm*—Blakely, Sokoloff, Taylor & Zafman LLP

(57) ABSTRACT

A disk drive having a magnetic recording disk with a transition zone is described. A surface texture of the transition zone induces the head to fly at a greater height than when operating over a data zone, while transitioning the head to a landing zone to park.

22 Claims, 19 Drawing Sheets

FOREIGN PATENT DOCUMENTS

WO        WO02/084650 A1    10/2002

OTHER PUBLICATIONS

Patent Abstracts of Japan, Publication No. 2000-251249, Sep. 14, 2000.
Patent Abstracts of Japan, Publication No. 09-167305, Jun. 24, 1997.
Patent Abstracts of Japan, Publication No. 09-081932, Mar. 28, 1997.
Patent Abstracts of Japan, Publication No. 2000-293840, Oct. 20, 2000.
Shoji Tanaka et al. "Characterization of Magnetizing Process for Pre-Embossed Servo Pattern of Plastic Hard Disks", IEEE Transactions on Magnetics, vol. 30, No. 6, Nov. 1994, p. 4209-4211.

* cited by examiner

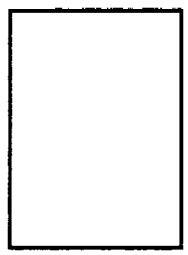  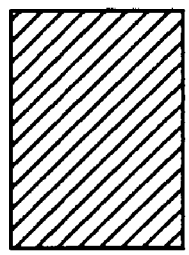 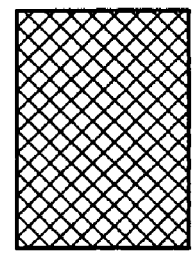 
FIG. 6A    FIG. 6B    FIG. 6C    FIG. 6D
HEAD FLY DIRECTION 18

MAGNETIC RECORDING DISK HAVING A TRANSITION ZONE

CROSS-REFERENCE TO RELATED APPLICATIONS

This application is a continuation-in-part of application Ser. No. 10/382,635, filed Mar. 5, 2003, herein incorporated by reference.

TECHNICAL FIELD

Embodiments of the invention relate to the field of disk drives and, more particularly, to disks used in disk drive systems.

BACKGROUND

In the field of hard disk storage systems, continuous improvements have been made in increasing the areal density (i.e., the number of stored bits per unit of surface area) of the magnetic recording disks. As is well known, decreasing the fly height of the read/write head, for example, results in reduced PW50 (the pulse width where the read head output amplitude, in response to an isolated transition, is 50% of the peak value) that allows for greater recording density. Bringing the head closer to the media has been a key area of effort in increasing recording densities.

In current disk drive systems that employ flying heads, there is a protective film of air between the slider and the disk, where no contact is intended to occur during head read/write operations. The read/write head element is typically a part of or coupled to a larger body that flies over the disk and is typically referred to as a "slider." The slider has a lower surface referred to as an air bearing surface (ABS). The ABS generally generates a positive air pressure. In addition, there is often a cavity or similar structure that creates a sub-ambient pressure to counterbalance the positive pressure to some extent. The slider body is attached to a suspension via a head gimbal assembly that biases the slider body towards the disk. The net effect of the ABS and the suspension is to cause the slider, and coupled head, to fly at the desired height when the disk is at full speed. The net effect also causes the slider to be in contact with the disk surface, when the disk is at rest, in contact-start-stop (CSS) disk drive systems. This contact between the slider and the disk occurs in an area when the drive is turned on and off, and is known as a CSS zone. Another type of disk drive system, referred to as load/unload disk drive system, parks the slider (more particularly a suspension arm on which the slider is secured) on a ramp, not the disk surface, when the drive is turned off.

In both types of disk drive systems, the head is idle and flies over a data zone while the disk is rotating awaiting instruction during a significant portion of the time in operation. As the flying height of the read/write head is reduced in the effort to increase recording densities, the frequency and likelihood of intermittent contact with the disk increases during drive operations. Such intermittent contact may cause the head to fly unstably and result in erroneous read back of data. In the worst-case scenario, if the impact of a hit is too severe, it may cause a head crash and damage the head and/or disk. Since the disk rotates very fast during normal operation of the drive, a concern is that the head should not undesirably contact the disk.

The ever increasing areal density demands are driving some advanced designs of disk drive systems to utilize contact-type or near contact type magnetic head technology, where the head is in direct contact with the disk when in operation. One problem of utilizing this head technology is that the continuous wear from the head will degrade the disk's surface by the slow displacement of lube and eventual wear of the protective carbon coating from the disk's surface. Such wear will eventually lead to catastrophic failure and loss of data. Another problem with contact or near contact recording head technology is head degradation, by way of flash temperatures (e.g., momentary, ultra-high temperatures from friction between head and disk), that may render the magnetic head transducer sensitivity unusable by the switching of the magnetic pin layer fields. Furthermore, the head and magnetic disk interface will be subject to higher sensitivity to both particulate and outgassing contamination that will result in heightened risks for thermal asperity or high fly read or write errors.

Furthermore, reducing the fly height of a head in the data zone increases the possibility of the slider inadvertently contacting a landing zone feature (e.g., a CSS zone laser bump) or a disk surface during load/unload operations. For example, in conventional CSS drives, the height of laser bumps on a CSS zone is lower than the fly height of a head over a data zone to avoid contact with the laser bumps while parking. However, it becomes difficult to facilitate low bumps to avoid inadvertent contact of a slider to the side of the bumps as the fly height becomes lower unless the bump height is lowered below the fly height of the slider. However, lowering the bump height may increase the amount of stiction high enough to cause damage to the slider and/or disk surface. In addition, while powering down, the air bearing supporting the fly height of the slider is disturbed and is eventually diminished as the slider transitions away from the data zone onto a landing zone feature, increasing the possibility of inadvertent contacts.

U.S. Pat. No. 6,075,683 discloses a disk drive having a slider exhibiting two fly heights, one for writing/reading operations and a second for an idling operation. The idling operation at the second fly height is performed over the landing zone (also referred to as the idling zone) by patterning the surface of this zone with depressions. U.S. Pat. No. 6,075,683 does not overcome the inherent problem of inadvertent contact of the slider with a landing zone feature while parking.

Other conventional disk drive systems seek to lessen the adverse affects caused by the abrupt topographical changes of the disk surface when transitioning a slider from a data zone to CSS zone by including a transition zone between the data zone and the CSS zone. For example, U.S. Pat. No. 6,020,045 discloses a transition zone that has laser textured protrusions on its surface that gradually increasing in height and diameter from the data zone to the CSS zone. One problem with such a transition zone is that while it may improve the flying stability of a slider, such a transition zone does not overcome the inherent problem of inadvertent contact of the slider with a CSS zone texture while parking. Rather, the slider may inadvertently contact a protrusion in either the transition zone and/or the CSS zone. Similarly, U.S. Pat. No. 6,139,936 discloses a disk having a laser textured transition zone that does not overcome the inherent problem of inadvertent contact of the slider with a CSS zone texture while parking.

BRIEF DESCRIPTION OF THE DRAWINGS

Embodiments of the invention may best be understood by referring to the following description and accompanying drawings that are used to illustrate embodiments of the invention in which:

FIGS. 6A, 6B, 6C, and 6D illustrate alternative embodiments of safe zone disk surface textures.

DETAILED DESCRIPTION

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

The terms "above," "below," and "between" as used herein refer to a relative position of one layer or component with respect to other layers or components. As such, one layer or component disposed above or below another layer may be directly in contact with the other layer or component, or may have one or more intervening layers or components. Furthermore, one layer deposited or disposed between layers may be directly in contact with the layers or may have one or more intervening layers.

A safe zone on a magnetic recording disk is disclosed to enhance the reliability of a magnetic disk drive system. The safe zone on the magnetic recording disk causes a head coupled to a slider over the safe zone to fly at a higher distance than the fly height of the head when the disk drive is in operation (e.g., during a write or read operation). One or more safe zones may be dispersed between data zone tracks of the disk, near the inner diameter of the disk and/or near/at the outer diameter of the disk. In one embodiment, the safe zone on the magnetic recording disk causes a head coupled to a slider to fly at a higher height while moving between a data zone and a landing zone on the disk. The higher fly height of the slider over such a safe zone reduces the possibility of the head inadvertently contacting a landing zone feature during transition to the landing zone. In such an embodiment, the safe zone in between the data zone and the landing zone may also be referred to as a transition zone. The head is induced to fly higher by altering the disk's surface structure and/or texture in a safe/transition zone from the surface structure and/or texture in the data zone of the disk. The higher fly height of the head over a transition/safe zone reduces contact wear and enhances mechanical reliability of a disk drive system.

Figure 1A:
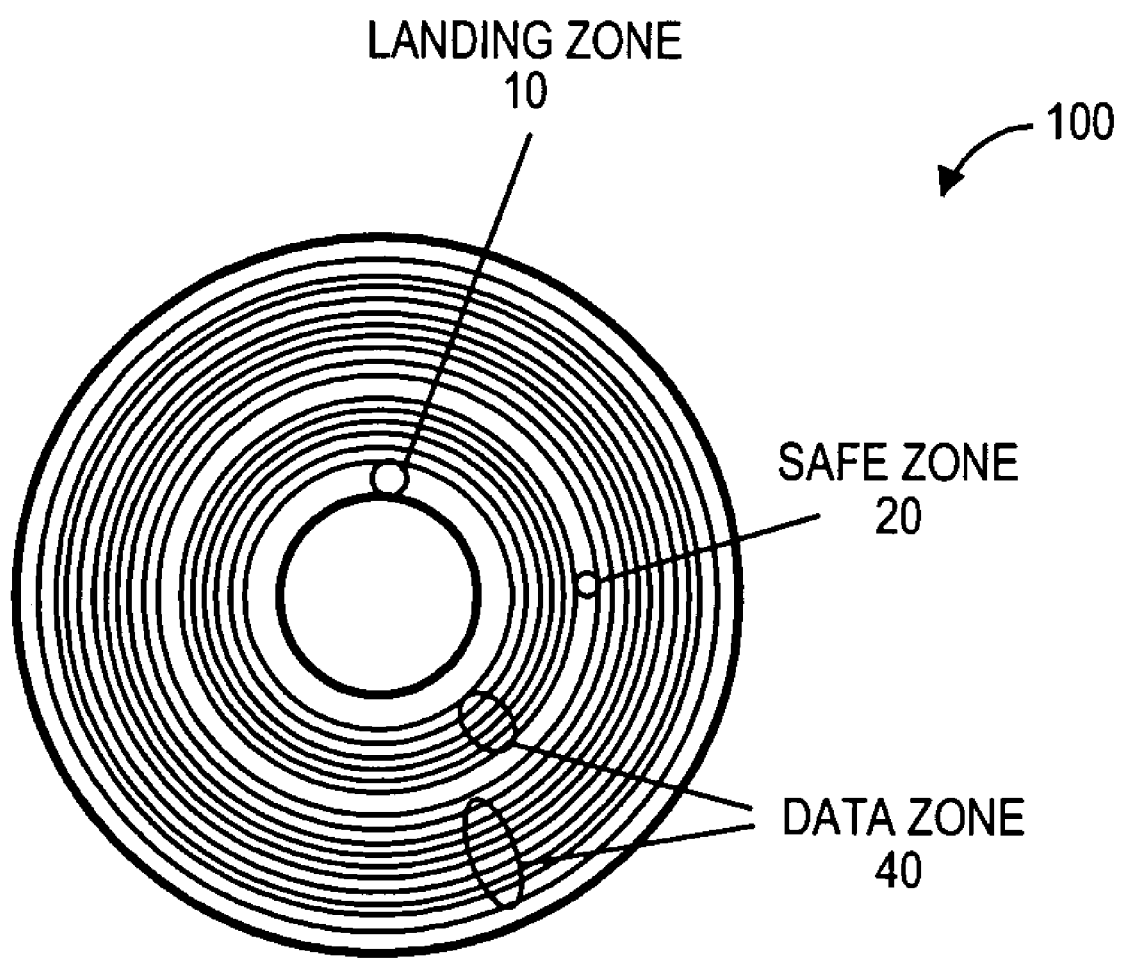
FIG. 1A illustrates a top view of one embodiment of a magnetic disk of a disk drive system having a safe zone.

FIG. 1A illustrates a top view of one embodiment of a magnetic recording disk of a disk drive system. The magnetic recording disk ("disk") 100 includes a landing zone 10, a safe zone 20 and one or more data zones 40. Landing zone 10 is where a slider (e.g., slider 1600 of FIG. 15) resides when the disk 100 is not rotating. In one embodiment, the landing zone 10 may be a CSS zone in a CSS type disk where the slider is in contact with the disk when the disk is not rotating. In order to increase the storage capacity of the disk 100, the inner diameter (ID) region on the disk 100 may be used for the CSS zone. Alternatively, other regions such as an outer diameter region may be used for the landing zone 10. In one embodiment, the CSS zone has a texture pattern (e.g., a laser induced bump texture) that reduces stiction when the slider lifts off from and lands on the landing zone 10. Static friction, or stiction, is a term used to describe the force exerted against the motion of the slider relative to the disk surface when the slider is at rest on the disk surface.

Figure 9:
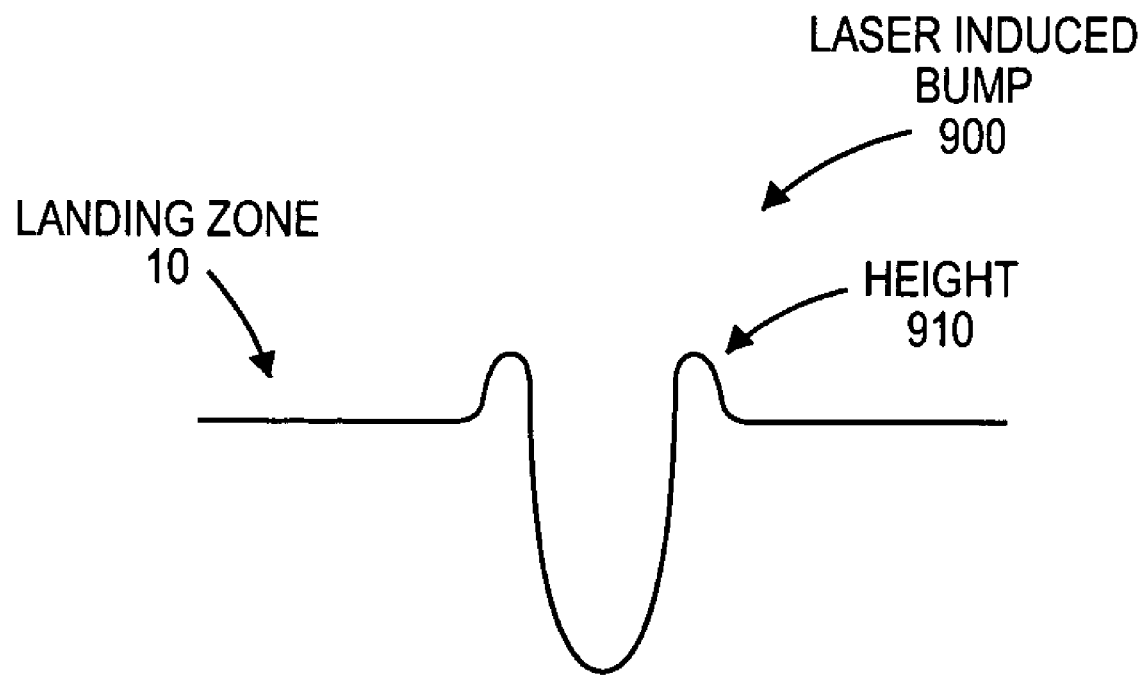
FIG. 9 illustrates one embodiment of a CSS zone laser induced bump.

FIG. 9 illustrates one embodiment of a CSS zone laser induced bump. The laser induced bump 900 may have a height 910 in approximately the range of 0.02 to 1 microinches. Alternatively, bump 900 may have other heights. It should be understood that the invention is not limited to laser induced bumps. Rather, in alternative embodiments, other textures well known to those of ordinary skill in the art may also be used. In an alternative embodiment, the slider may also include pads or small features such as texture, which act as contact surfaces with the disk surface in order to further reduce stiction, as discussed below in relation to FIG. 15.

Alternatively, the landing zone 10 may be a non-contact area residing beneath a ramp (e.g., ramp 1205 of FIG. 12) in a load/unload type disk drive system (also referred to as a load/unload zone) where the slider is transitioned to and/or parked on the ramp, not the disk surface, when the disk is not rotating. It should be understood, however, that the disk 100 need not have a landing zone 10 when used in a load/unload drive system, as will be explained. For example, in one embodiment, the non-contact area residing beneath the ramp may be an extension of transition zone 20. Alternatively, the load/unload drive may use a landing zone 10 having a transition zone 20 like surface extending out beyond the ramp.

In one embodiment, the safe zone 20 may be a non-data zone having a surface structure and/or texture that induces the head to fly higher when the head is idling or approaching the landing zone 10 to park, as will be further described below. The surface texture of the safe zone 20 may be different than the surface textures of the intended data zone 40 and the landing zone 10, as is described below. The data zone 40 may include magnetic material that may be manipulated to store data in a manner known to those of skill in the art. In one embodiment, data zone 40 includes a DTR pattern as discussed below in relation to FIGS. 2A and 2B. Alternatively, safe zone 20 is also suitable for use with non-DTR patterned disks. Although the safe zone 20 and the landing zone 10 have been described as a non-data zone, it should be understood that a non-data zone may contain servo signals to control the head positions.

Figure 2A:
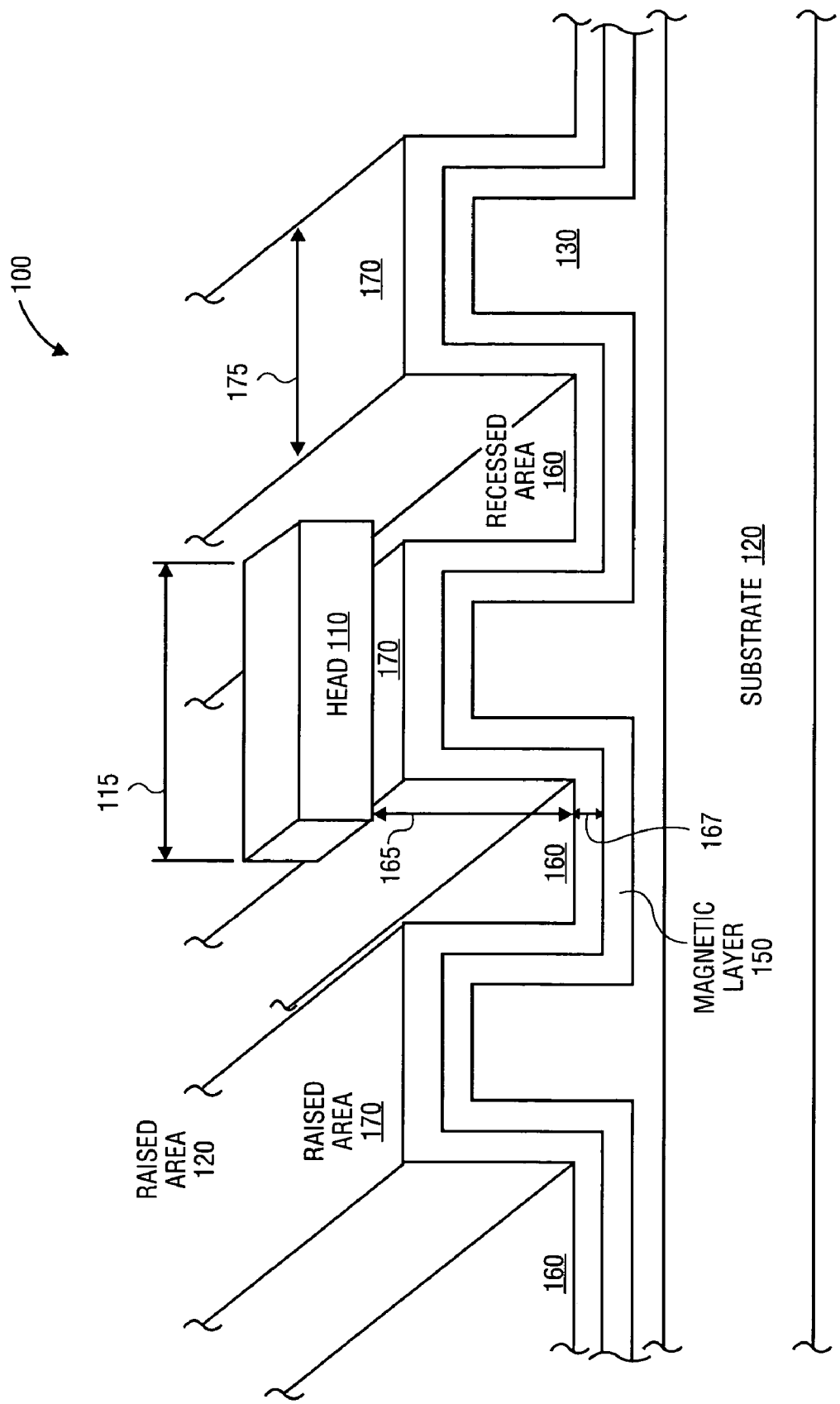
FIG. 2A illustrates a cross-sectional perspective view of one embodiment of a patterned data zone of the magnetic disk and a head.

FIG. 2A illustrates a cross-sectional perspective view of one embodiment of a patterned data zone of a magnetic disk and a head. The disk 100 includes a substrate 120, that may be textured, and multiple film layers disposed above the substrate 120, some of which have been omitted for clarity of the following discussion. Substrate 120 may be, for example, a glass substrate or a metal/metal alloy substrate. Glass substrates that may be used include, for example, a silica containing glass such as borosilicate glass and aluminosilicate glass. Metal alloy substrates that may be used include, for example, aluminum-magnesium (AlMg) substrates. In an alternative embodiment, other substrate materials including polymers and ceramics may be used.

During operation of the disk drive, the reading and writing of data on the data zone 40 of the disk 100 is accomplished by flying head 110 over the rotating disk 100 in a manner well known to those of ordinary skill in the art. For example, to perform a write operation (e.g., to store data) to the disk 100, the head 110 is positioned above a writable data track of data zone 40 to change the polarization of the magnetic media of disk 100 and, thereby, store electronic data longitudinally or perpendicularly. In one embodiment, head 110 may have a magneto-resistive (MR) and, in particular, a giant magneto-resistive (GMR) read element and an inductive write element. In an alternative embodiment, head 110 may be another type of head, for examples, a Hall effect head or an inductive head having a common element for both read and write operations. Magnetic recording heads are known in the art; accordingly, a detailed description is not provided.

In one embodiment, disk 100 may include a discrete track recording pattern formed, for example, in patterned layer 130. One method for increasing recording densities is to pattern the surface of a disk to form discrete data tracks, referred to as discrete track recording (DTR). DTR disks typically have a series of concentric raised areas (e.g., hills, lands, elevations, etc.) storing data and recessed areas (e.g., troughs, valleys, grooves, etc.) that may store servo information. The recessed areas 160 separate the raised areas 170 to inhibit or prevent the unintended storage of data in the raised areas. The recessed areas 160 have a depth 165 relative to the recording head 110 and/or raised areas 170. In one embodiment, the width 115 of the head 110 is greater than the width 175 of the raised areas 170 such that portions of the head 110 extend over the recessed areas 160 during operation. However, the recessed areas 160 are sufficiently separated by a distance 165 from the head 110 to inhibit storage of data by the head 110 in the magnetic layer 150 directly below the recessed areas 160. The raised areas 170 are sufficiently close to the head 110 to enable the writing of data in the magnetic layer 150 directly below the raised areas 170. In one embodiment, for example, a width 175 of each raised zone may be about 1250 angstroms (Å) and a width of each recessed zone may be typically about ⅓ of the raised zone, or about 400 Å. In other embodiments, the raised and recessed zones may have a pitch between about 200–2000 Å. A depth 165 of each recessed zone, for example, may be about 400 Å. The dimensions discussed above are exemplary and may have other values.

The discrete stamped pattern may be embossed, or otherwise formed, into the patterned layer 130 with the magnetic layer 150 disposed above the patterned layer 130, either before or after embossing. When data are written to the patterned recoding medium, the raised areas 170 constitute the data tracks. Information, such as servo (head positioning) signals may be stored in the recessed areas 160. Alternatively, servo signals may be interleaved with data in sectors and stored on the raised areas 170. The raised areas 170 and recessed areas 160 are typically formed as alternating concentric circles, although other configurations (e.g., spiral) are contemplated. Therefore, the recessed areas 160 isolate the raised areas 170 (e.g., the data tracks) from one another, resulting in data tracks that are defined both physically and magnetically. The formation of a DTR pattern is known in the art; accordingly a detailed description is not provided.

Figure 2B:
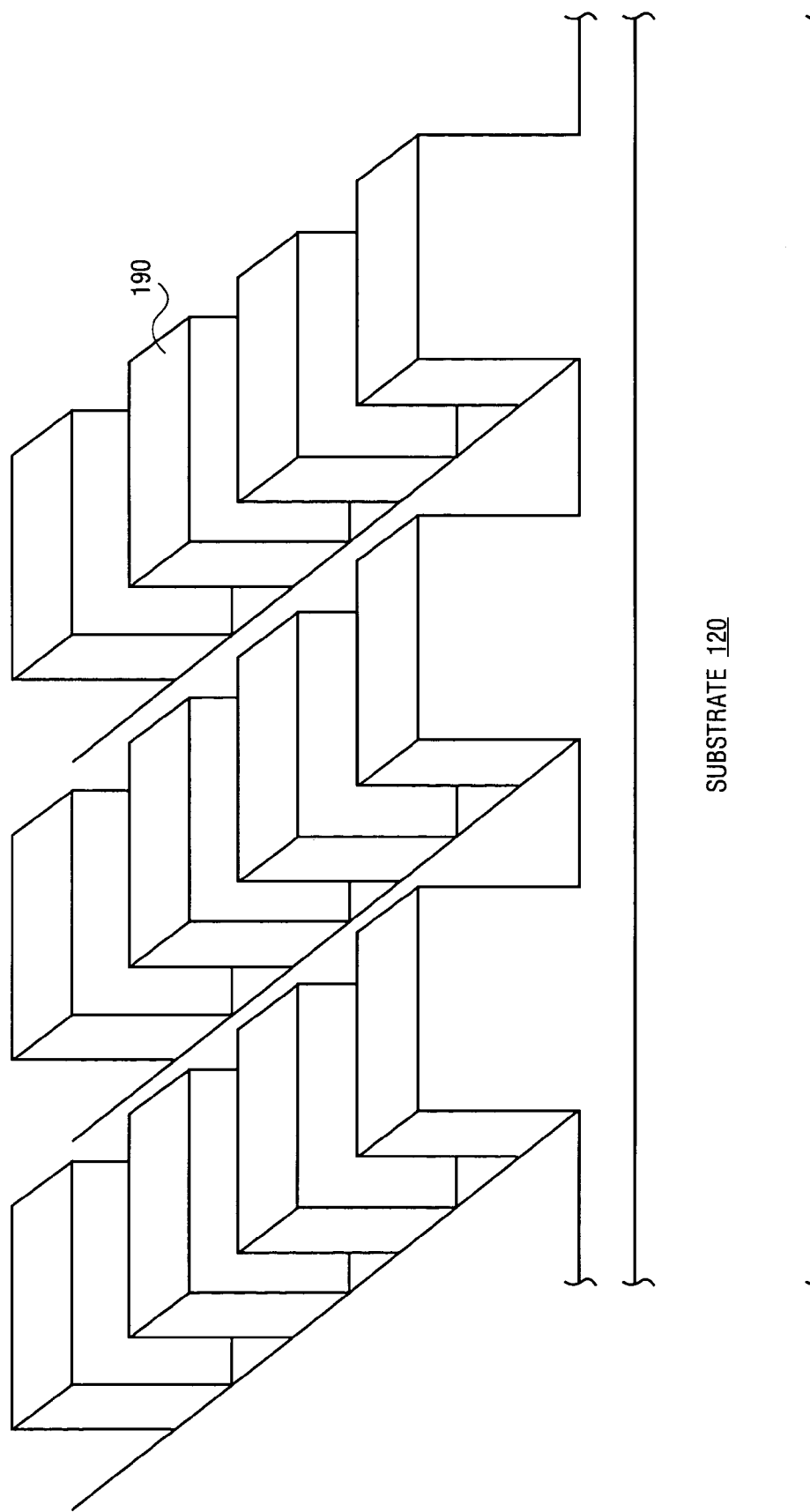
FIG. 2B illustrates a cross-sectional perspective view of an alternative embodiment of a patterned disk.

It should be noted that various types of discrete track patterns may be generated in addition to what is illustrated in FIG. 2A. For example, in an alternative embodiment, the discrete track pattern may include data islands as illustrated in FIG. 2B. Each of the data islands 190 may hold a block of data (e.g., one bit or multiple bits) and are isolated from one another by the recessed areas, thereby forming a discrete bit recording pattern. Such a configuration may reduce the amount of noise (e.g., noise between tracks and between blocks of data or bits) that is sensed by the read head 110. In other examples, the recessed and raised areas may have alternative shapes that still isolate data blocks from recessed areas.

Furthermore, the recessed areas 160 could be partially filled with lubricant or other material to protect the wall of the recessed areas 160 from corrosion. In this way, the lubricant can have higher vapor pressure (e.g., lower molecule weight) because the structure of the recessed areas 160 has a very small cavity, which can hold low pressure molecules whose mechanism is known as "capillary condensation" or "Thomson effect," which is well known to those of ordinary skill in the art.

Figure 1B:
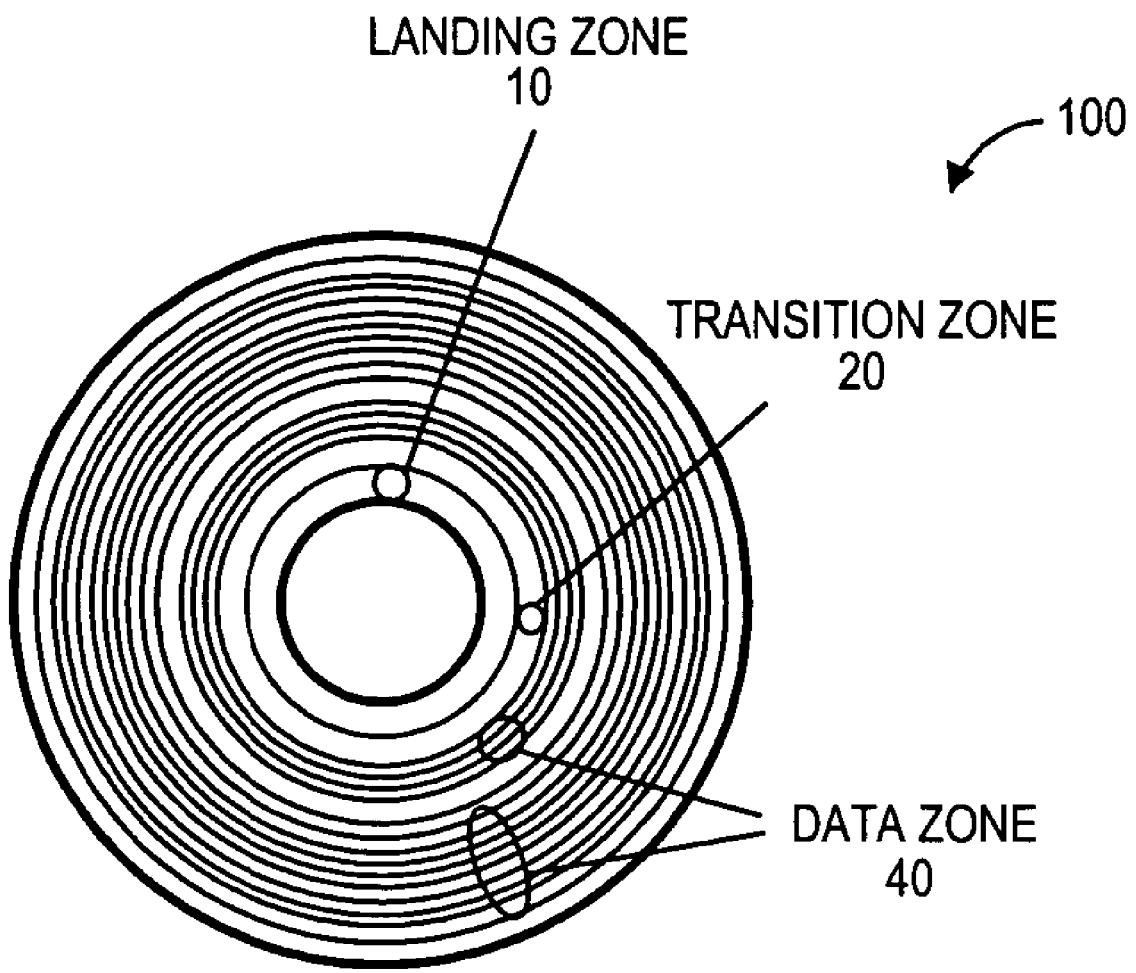
FIG. 1B illustrates a top view of one embodiment of a magnetic disk of a disk drive system having a transition zone.

A DTR pattern induces the slider (e.g., slider 1600 having head 110) to fly closer to the data zone's surface relative to a data zone without such a pattern. In one embodiment, the fly height of head 110 over a DTR patterned data zone may be, for example, approximately in the range of 0.05 to 1 microinches and the height 910 of a laser bump 900 in CSS zone 10 may be, for example, approximately in the range of 0.02 to 1 microinches. In such an embodiment, the fly height of a slider (e.g., slider 1600—not shown in FIG. 2A) over a data zone 40 may be lower than the height of a laser induced bump or other structures in the landing zone 10 (as shown e.g., in FIG. 10). The use of transition zone 20 between data zone 40 and landing zone 10, as illustrated in FIG. 1B, reduces the probability of inadvertent contact of the slider with the landing zone 10 surface features during parking operations. Inadvertent contact between the slider and the texture features of landing zone 10 may cause damage or wear of the disk 100 surface and the slider, and the generation of debris. The use of a transition zone 20 on a disk 100 may, thereby, greatly enhance the mechanical reliability of the slider-disk interface.

Referring again to the disk 100 of FIG. 2A, multiple film layers (e.g., magnetic recording layer 150) are disposed above the substrate 120. In one embodiment, the disk 100 may be manufactured with a glass substrate or a metal/metal alloy substrate. Glass substrates that may be used include, for example, a silica containing glass such as borosilicate glass and aluminosilicate glass. Metal alloy substrates that may be used include, for example, AlMg substrates. In an alternative embodiment, other substrate materials such as polymers and ceramics may be used.

In one embodiment, one or more textures may be generated on the surface of the substrate 120 (or on a layer disposed on the substrate, e.g., a plated NiP layer) for one or more of the zones (data zone 40, landing zone 10 and/or a safe zone 20). In particular, one of the layers below the data zone 40 may be textured to produce a desired magnetic orientation in the magnetic film layer 150. The texturing of the layer below the data zone 40 may encourage preferred circumferential orientation of the magnetic media of magnetic recording layer 150 by affecting the orientation and size of the crystallites in the below residing under layers which, through the epitaxy of growing the magnetic layer 150 above the textured layer, in turn affects the orientation of the crystallites of the magnetic layer 150, thereby inducing orientation of the magnetic media. Preferred circumferential orientation of the magnetic media on disk 100 may aid in achieving optimal signal-to-noise ratio (SNR) and resolution to obtain the best possible performance from the magnetic media. Such a texture propagates through above deposited layers to appear on the uppermost layer surface of disk 100, as illustrated for examples in FIGS. 3A–3C. As previously noted, such a texturing need not be limited to data zone 40 of disk 100 but may also appear on the landing zone 10 and/or transition zone 20 of disk 100.

Figure 3A:
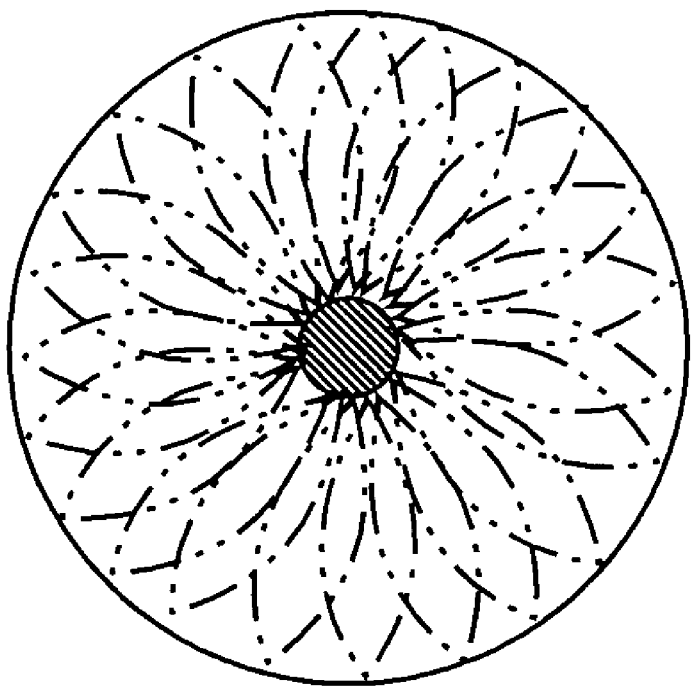
FIGS. 3A, 3B, and 3C illustrate alternative embodiments of data zone texture patterns.
Figure 3B:
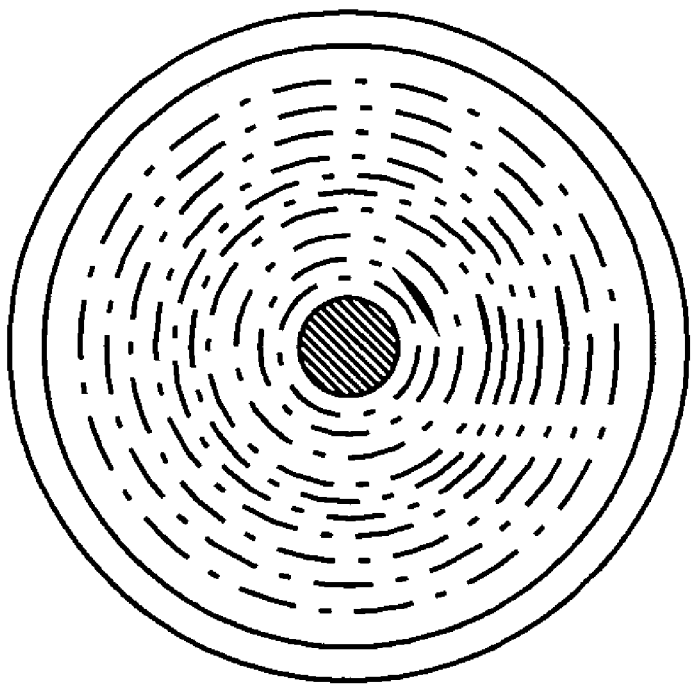
Figure 3C:
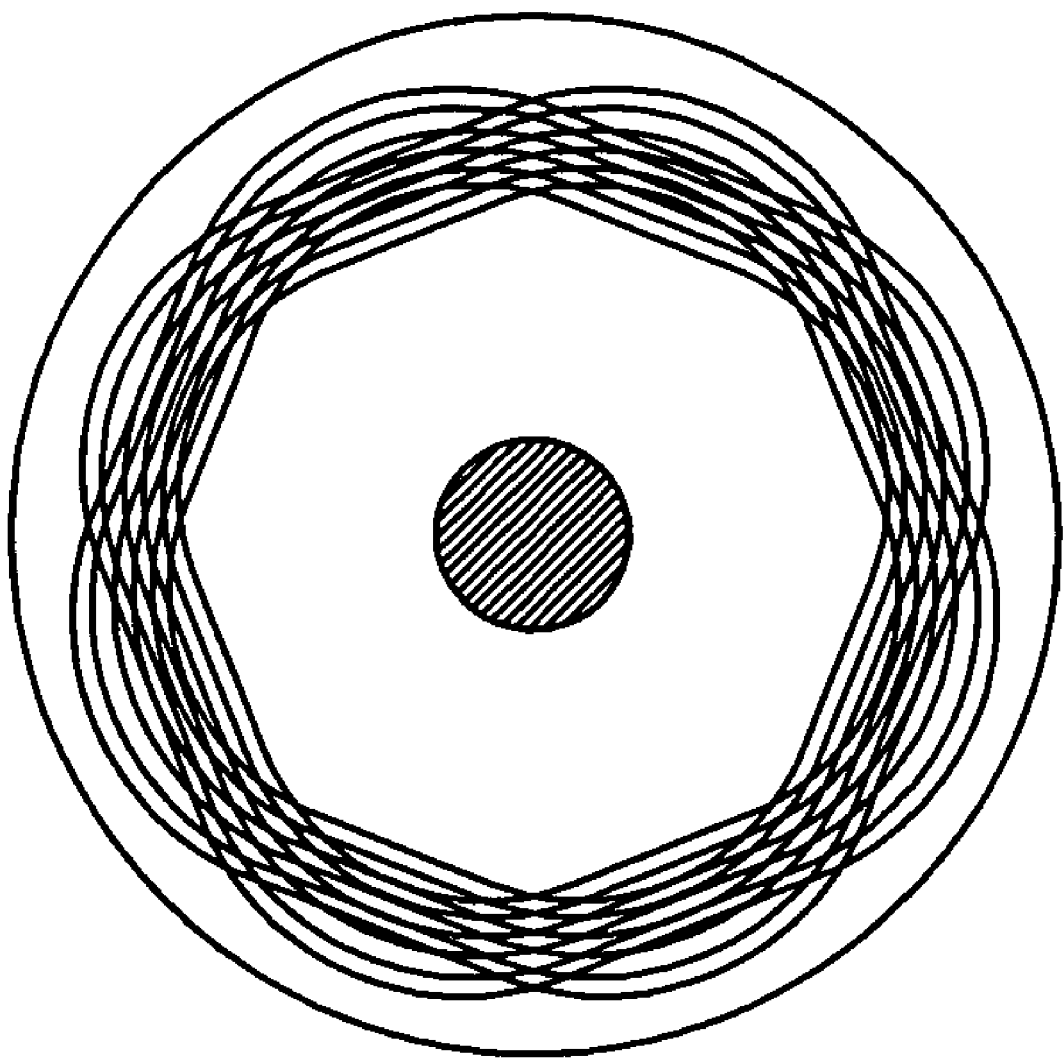

FIGS. 3A, 3B and 3C illustrate alternative embodiments of texture patterns. FIG. 3A illustrates a magnetic disk having a rosette texture pattern. FIG. 3B illustrates a magnetic disk having a circumferential texture pattern. FIG. 3C illustrates a magnetic disk having a crosshatch texture pattern. For example, in one embodiment, the circumferential texture pattern shown in FIG. 3B has microscopic circumferential (or substantially circumferential) grooves or scratches on the surface of the raised zones of the substrate 120. Substrate 120 may be mechanically textured using fixed or free abrasives. To generate a cross-hatch texture, for example, a substrate is clamped to the spindle platform that rotates during operation. A tape, treated with a diamond slurry, is mounted on the tape roller and positioned against the substrate. The machine is configured to oscillate the spindle, thereby moving the substrate back and forth, while the tape roller presses the tape against the surface of the substrate. The grooves in the substrate are created by the trajectories of individual diamond particles moved across the substrate surface. The resulting texture pattern made by the trajectories is a function of the frequency of both the substrate platform oscillation and the frequency of the substrate platform rotation.

With certain frequencies, the particulate trajectories will not retrace themselves during successive disk rotations and, thus, generate groove crossings that interweave to form a cross-hatch texture in the substrate, as illustrated in FIG. 3C. Alternatively, other oscillation and rotation frequencies may be used. For example, if the oscillation and rotation frequencies are matched (or e.g., have an integer ratio), or the platform/tape is not oscillated, the tape particulate trajectories result in a circumferential texture pattern in the substrate (or above deposited layer such as a NiP layer mentioned above), as illustrated in FIG. 3B. Alternatively, other texturing methods may be used such as emboss texturing and laser texturing. It should be understood that the invention is not limited to the texture patterns described herein, and alternative texture patterns well known to those of ordinary skill in the art may also be used.

Where disk 100 has a DTR pattern, the aforementioned texturing refers to the surface topology of the substantially horizontal recessed areas 160 and raised areas 170 rather than to the gross changes in height associated with the DTR pattern.

In one embodiment, the top surface of landing zone 10 (e.g., functioning as a CSS zone) may be textured (e.g., with or without the under layer texturing discussed above) to reduce stiction between the slider and the surface of disk 100. In order to improve the CSS performance, it is well understood that friction must be minimized between the slider and the disk. The CSS texture pattern may be applied to the disk by mechanically abrading the substrate surface using well known techniques. Alternatively, other methods may be used to provide the necessary texture in the CSS zone, for example, laser texturing. In laser texturing, a laser beam is focused to a small spot on the disk surface, forming uniformly shaped and sized textures in a controllable pattern.

In contrast to the requirements of CSS operation, for reading or writing data it is desirable that the surface of the top most layer above data zone 40 be as smooth as possible to allow the head to fly as close as possible to the disk surface. Because of these differing requirements when the disk is used for CSS disk drives, the landing zone 10 may be, in one embodiment, textured more heavily than the data zone 40 portions of the disk used for data storage through the texturing on the substrate's surface that propagates through the subsequently deposited layers to appear on the surface of the top most layer (e.g., overcoat protection layer) on disk 100.

Because the data zone 40 is smoother than a CSS zone, both the glide height (minimum distance at which a head slider may fly without contacting any portion of the disk surface) and the glide avalanche height (distance above mean disk surface level at which the head slider makes regular and continuous contact with the disk surface) are lower in the data zone 40 than in the CSS zone. As such, when the head 110 is moved from over the data zone 40 to the CSS zone, the glide avalanche height of the portion of the disk by the amount of the laser bump height increases because the head 110 must be able to safely move between the two zones, without undue contact in the CSS zone that could lead to wear of the disk surface, the slider, and generation of debris. However, such increase in height does not occur during read/write operations or idling of the head 110. However, as the head 110 flies lower in the data zone 40, such as over a DTR data zone, the immediate transition of the fly height is typically not enough to overcome the height of the landing zone features such as, for example, laser induced bumps 900. As previously mentioned, the use of a transition zone 20 may also provide an additional margin against the inadvertent contacts between the slider and disk 100 during load/unload operations.

FIGS. 6A–D illustrate alternative safe zone disk surface textures that may be used to induce a head to fly higher than when the head is over a data zone. For example, the surface of the disk 100 in the safe zone 20 may be a planar smooth surface without a DTR pattern structure as illustrated in FIG. 6A. The planar surface may be a two-dimensional surface, which is substantially flat, with a substantially uniform depth and thickness relative to the DTR pattern. In should be noted that surface of the safe zone 20 may have a texture generated by texturing of substrate 120 (or on a layer disposed on the substrate, e.g., a plated NiP layer) yet be planar with respect to the gross changes in height associated with a DTR pattern in data zone 40.

FIG. 6B illustrates a safe zone surface structure having radial grooves. In one embodiment, the grooves are oriented radially at a spacing of approximately 10 micron pitch with lands that are approximately 10 microns wide. FIG. 6C illustrates a safe zone surface structure having slanted grooves. FIG. 6D illustrates a safe zone surface structure having cross-hatched grooves. It should be understood that, in one embodiment, the depth of the grooves in the safe zone may be the same or less than the depth of the grooves relative to the planar surface in the data zone. It should also be understood that the angles formed by the cross-hatched grooves in the safe zone are different from the angles formed by the cross-hatch texture in the data zone. For example, the angles formed in the data zone are greater than the angles formed in the safe zone (e.g., 20 to 70 degrees made by the cross-hatch in the safe zone).

It should be appreciated that in each of the safe zone surface structures illustrated in FIGS. 6A–D, the spacing of the groove and land geometry is optimized to alter the fly height of a head to be higher than over the data zone (e.g., circumferential DTR pattern surface structure). In each of the FIGS. 6A–D embodiments, the surface patterns induce the head to fly higher by lessening the amount of air leakage pressure building up under the head when the head is flying. It should be understood that yet other texture patterns may also be used to increase the fly height of the head 110, for example, a texture comprised of a matrix of circles.

In should be appreciated that the texture pattern illustrated in FIGS. 6B, 6C, and 6D may also act as a cleaning surface for the air bearing surface (ABS) of head 110 in contact type recording drive systems. The grooves, oriented transversely to the fly direction of the head, act as a "shoe scraping" effect on the ABS.

One or more embossing tools, or stampers, may be used to create a discrete track pattern and/or the safe zone texture on the disk 100. In one embodiment, a stamper may be generated with a texture that is imparted to the raised areas 170 of the discrete track pattern in the data zone. In an alternative embodiment, a laser texture tool, well known to those of ordinary skill in the art, may be used to generate the various safe zone patterns on the disk 100. In one embodiment, the safe zone 20 may be sized substantially to the width of head 100 (e.g., approximately 1 mm in width).

Figure 4A:
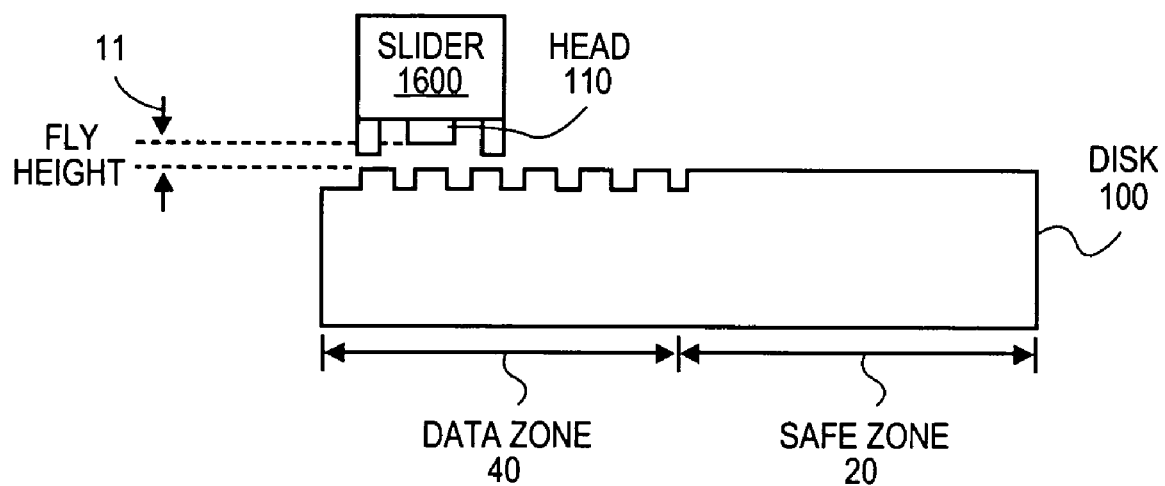
FIGS. 4A and 4B illustrate a cross-sectional view of one embodiment of the fly heights of a head over different zones of a magnetic recording disk.
Figure 4B:
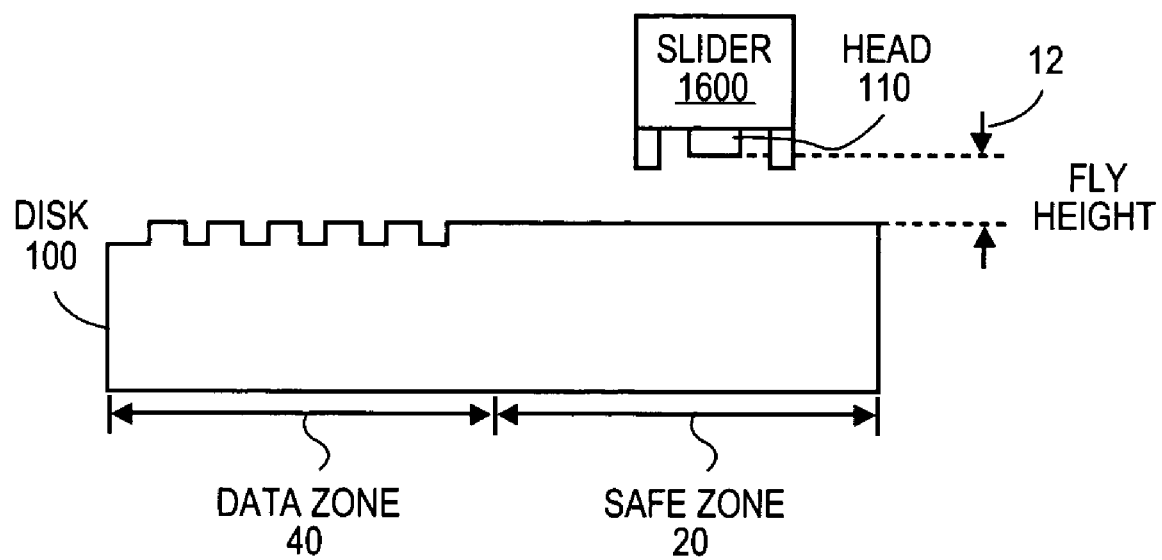
Figure 5:
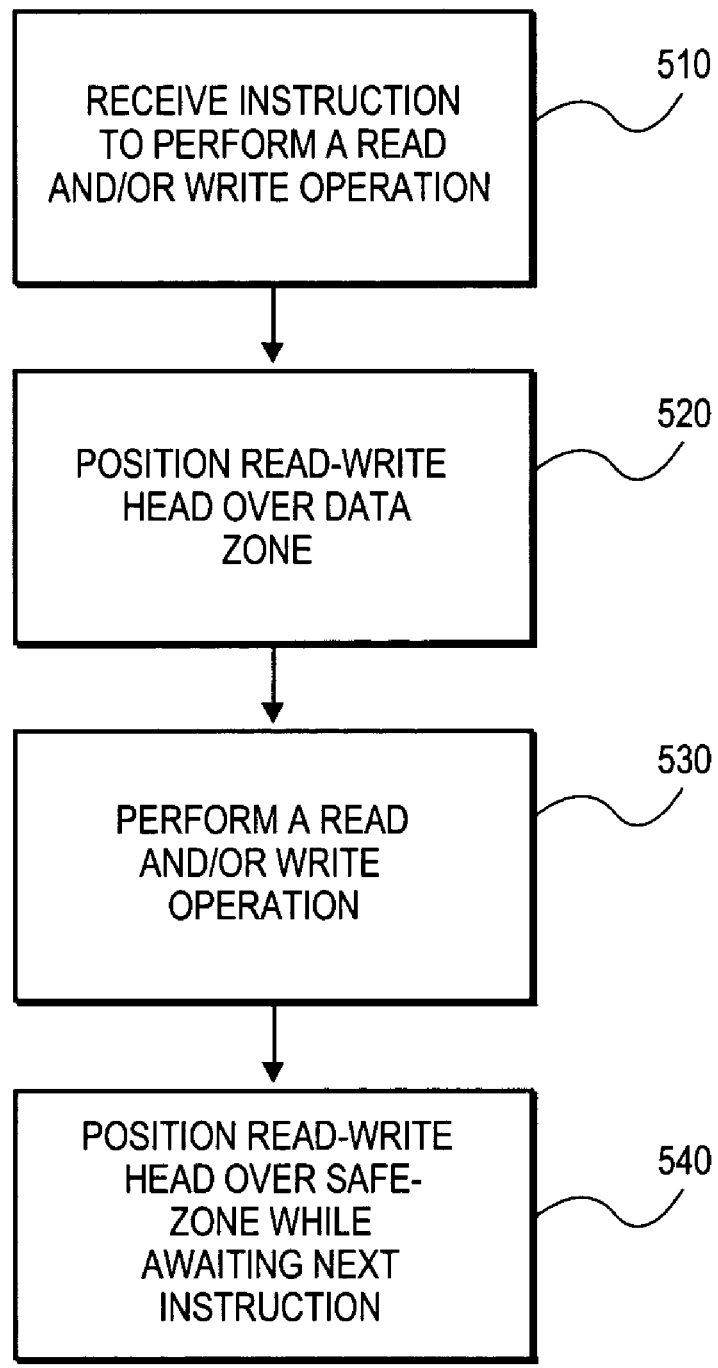
FIG. 5 illustrates one embodiment of a process flow for positioning the head over the safe zone with reference to FIGS. 4A and 4B.

FIGS. 4A and 4B illustrate a cross-sectional view of one embodiment of the fly heights of a head over magnetic recording disk 100 having a data zone and a safe zone. FIG. 5 illustrates a process flow for positioning a head 110 over a track of safe zone 20 with reference to FIGS. 4A and 4B. At block 510, the electronic drive intelligence software receives an instruction to perform a read and/or write operation to the data zone 40 of the magnetic disk 100. At block 520, the head 110 is positioned over the data zone 40 at a fly height 11 to perform the read and/or write operation, as shown in FIG. 4A. In one embodiment, for example, the fly height 11 of head 110 over data zone 40 may be approximately in the range of 0.05 to 1 microinches. In one embodiment, the fly height 12 of head 110 over safe zone 20 may be approximately in the range of 140–145% of the fly height 11 of head 110 over the data zone 40. In one particular, embodiment, for example, the fly height 12 may be substantially the fly height 11 plus approximately 0.4 microinches. It should be noted that fly heights outside the exemplary ranges and percentages provided above may be used by changing the design of the air bearing and cavities. In particular, fly height 11 of head 110 may be lower than 0.05 microinches, approaching approximately zero for contact recording operations. It should also be noted that the fly heights may not be uniform across a zone (in particular, data zone 40) due to difference in skew and linear speed from the ID to the OD of disk 100.

At block 530, the read and/or write operation is performed. At block 540, upon completing the read and/or write operation, the head 110 is positioned over the safe zone 20 at a fly height 12, as shown in FIG. 4B. In this way, the fly height 12 of the head 110 over the safe zone 20 is greater than the fly height 11 of the read-write 110 when over the data zone 40. Typically, after performing a read and/or write operation, the head 110 becomes idle and the magnetic disk 100 continues to rotate, awaiting a subsequent instruction or transition to a parked position.

The ability to increase the fly height provides clearance between the slider 1600 and disk 100 thus mitigating abrasive wear of the slider and disk. This is particularly desirable in disk drive systems utilizing contact or near contact recording head technology because such systems require either closer proximity or direct contact magnetic technology between the head and magnetic disk. It should be appreciated that since drive systems are not continuously reading and writing, a significant amount of time of slider/head-disk abrasion may be avoided by repositioning slider 1600 over one or more of the safe zone 20 where head 110 flies higher, thereby increasing the clearance between the slider 1600 and disk 100, and avoiding contact with the disk while the disk system is idling or parking and not performing a read-write operation. In this way, the mechanical reliability of this slider-disk interface is greatly enhanced.

Following block 540, the electronic drive intelligence software may either instruct the head 110 to perform a subsequent read and/or write operation in the data zone 40, or instruct the head 110 to return to the landing zone 10. In the landing zone 10, the slider 1600 rests directly on the surface of the landing zone (in the embodiment where landing zone is a CSS zone) and the disk 100 ceases to rotate until a new operating instruction is received.

In one embodiment, electronic drive intelligence software may be used by the magnetic disk drive system to control the movement of the head 110 over the landing zone 10, the transition zone 20 and the data zone 40. In one embodiment, the electronic drive intelligence software directs the head 110 over the transition zone 20 from the data zone 40 when the magnetic disk drive system receives an instruction to park the slider 1600 in the landing zone 10, as will be described in further detail below.

Figure 10:
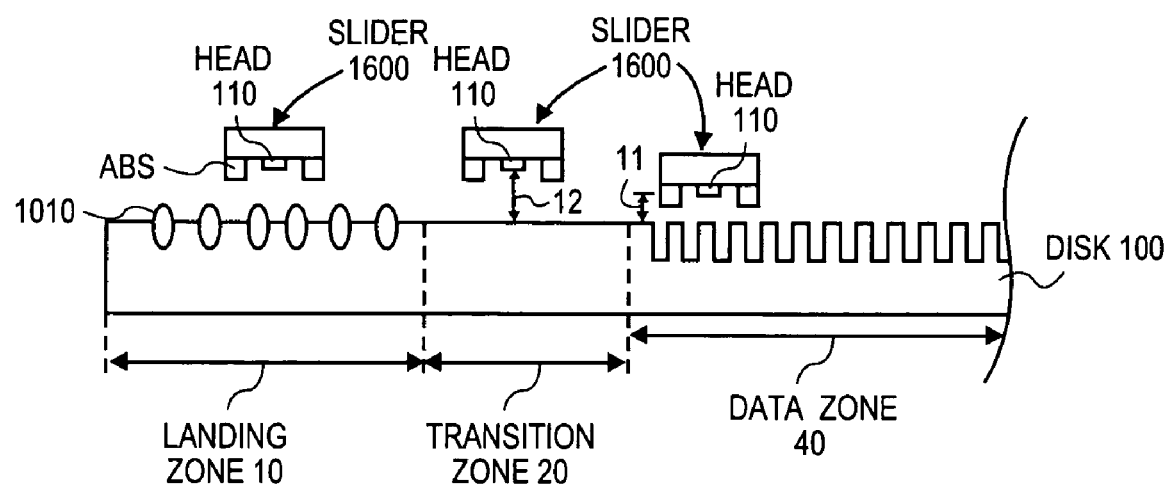
FIG. 10 illustrates a cross-sectional view of fly heights of a head operating over a data zone, transition zone and CSS zone of a magnetic recording disk.
Figure 11:
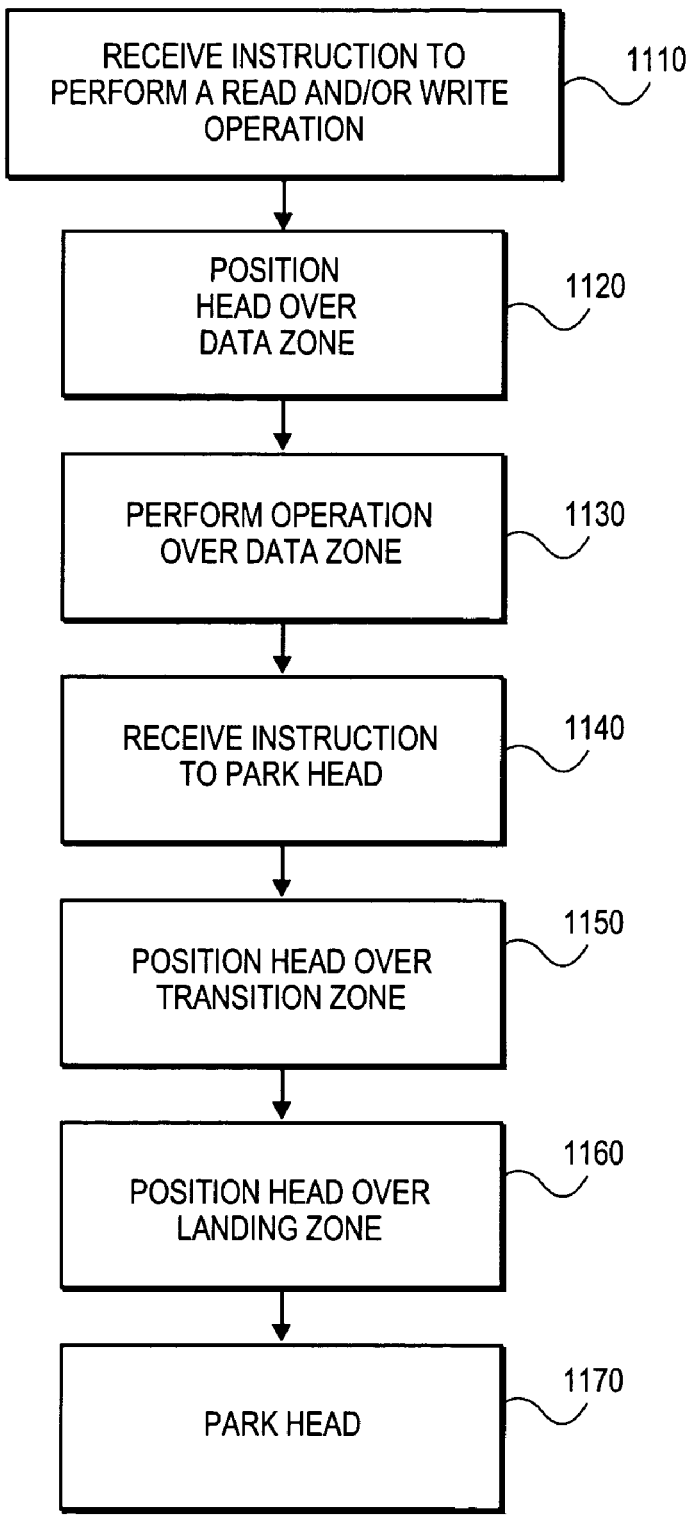
FIG. 11 illustrates one embodiment of a method of operating a head over the disk zones of FIG. 10.

FIG. 10 illustrates a cross-sectional view of the fly heights of a head operation over a data zone, transition zone and CSS zone of a magnetic recording disk. FIG. 11 illustrates one embodiment of a method of operating a head over a magnetic recording disk with reference to FIG. 10.

At block 1110, the electronic drive intelligence software receives an instruction to perform a read and/or write operation to the data zone 40 of the magnetic disk 100. In one embodiment, the data zone 40 includes a DTR patterned surface.

At block 1120, the electronic drive intelligence software directs the positioning of the head 110 over the data zone 40. The head 110 is at a fly height 11, as shown in FIG. 10, when over the data zone 40 at least because of the air bearing pressure between the head 110 and the data zone 40 surface. At block 1130, the read and/or write operation is performed. At block 1140, the electronic drive intelligence software receives an instruction to park the head 110 in the CSS landing zone 10. The electronic drive intelligence software may park the head 110 in the landing zone 10, for example, when the disk drive system is powering down.

At block 1150, the electronic drive intelligence software directs the positioning of the head 110 over the transition zone 20. The air pressure induced by the surface of the transition zone 20 causes the fly height 11 of the head 110 to increase to fly height 12 as it travels over the transition zone 20 from the data zone 40 to the landing zone 10 as shown in FIG. 10. At block 1160, the electronic drive intelligence software directs the positioning of the head 110 over the landing zone 10 while parking. Also, the fly height 12 of the head 110 over the transition zone 20 ensures the head 110 sufficiently clears the surface 1010 (e.g., laser induced bumps) of the landing zone 10 as the head 110 continues to land on the landing zone 10 as shown in FIG. 10.

At block 1170, the electronic drive intelligence software directs the head 110 to park in the CSS landing zone 10. In the landing zone 10, the slider 1600 (having head 110) rests directly on the surface of the landing zone 10 and the disk 100 ceases to rotate until a new operating instruction is received.

Figure 12:
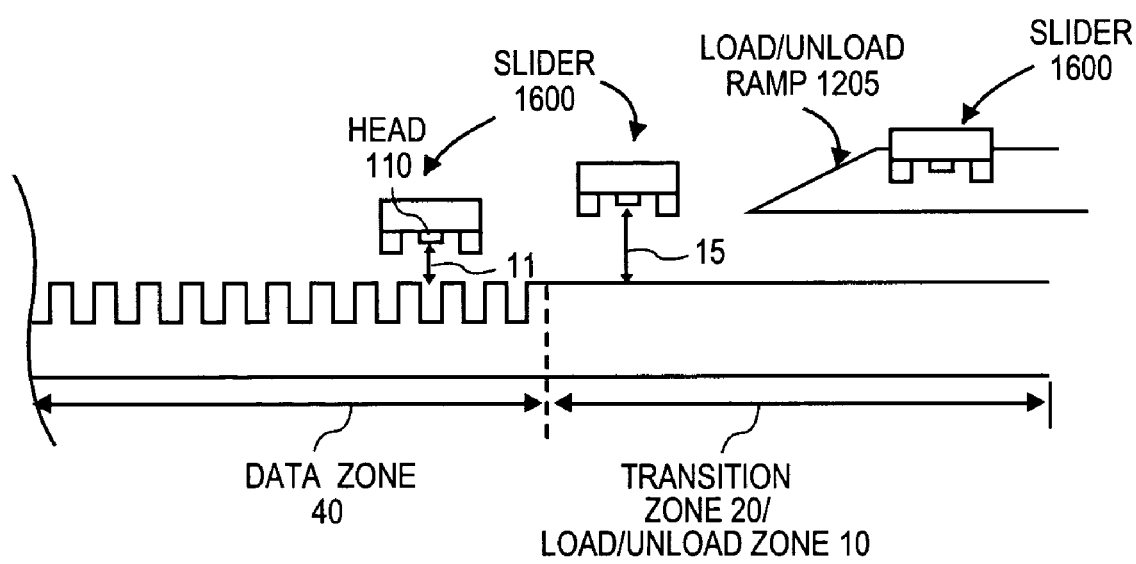
FIG. 12 illustrates a cross-sectional view of the fly heights of a head operating over a data zone, a transition zone and a ramp.
Figure 13:
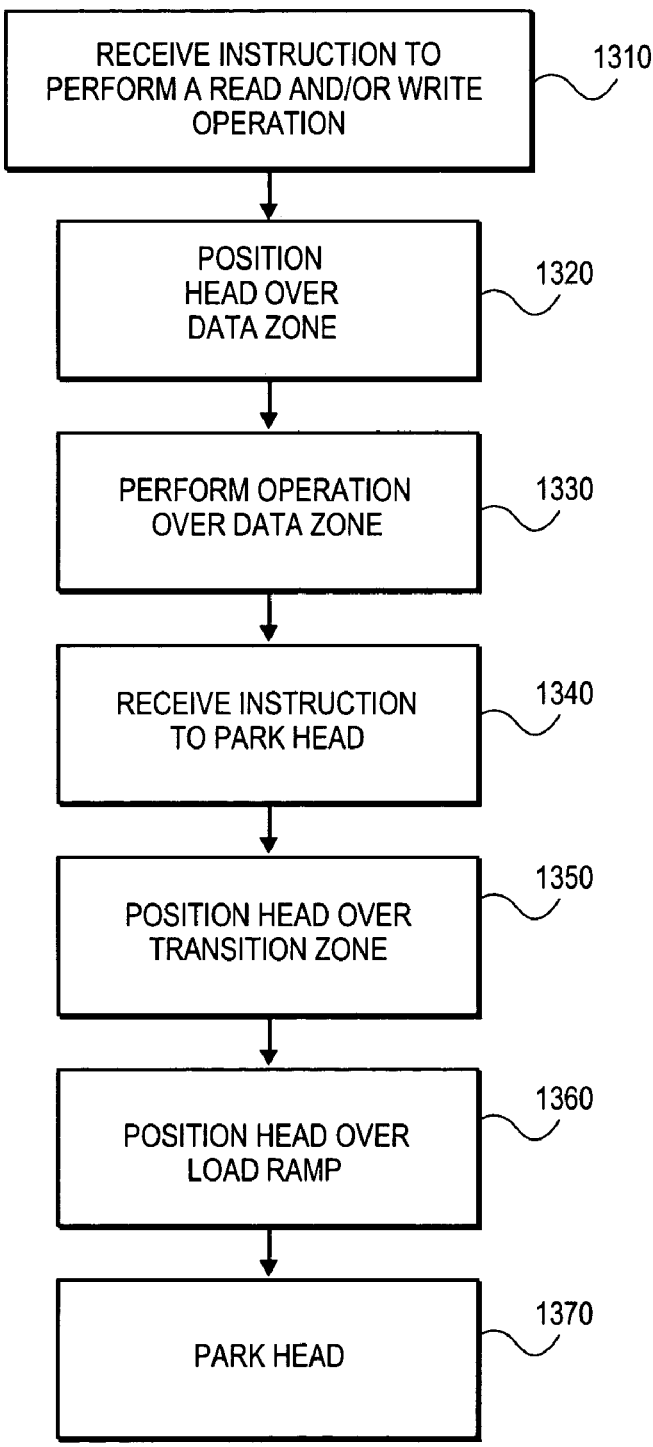
FIG. 13 illustrates one embodiment of a method of operating a head over the disk zones of FIG. 12.

FIG. 12 illustrates a cross-sectional view of a head operating over different zones of a disk and parked on a load/unload ramp. FIG. 13 illustrates one embodiment of a method of operating a head over a disk with reference to FIG. 12.

At block 1310, the electronic drive intelligence software receives an instruction to perform a read and/or write operation from the data zone 40 of the magnetic disk 101. In one embodiment, the data zone 40 includes a DTR patterned surface. At block 1320, the electronic drive intelligence software directs the positioning of the head 110 over the data zone 40. The head 110 is at a fly height 11, as shown in FIG. 12, when over the data zone 40 at least because of the air bearing pressure between the head 110 and the data zone 40 surface. At block 1330, the read and/or write operation is performed. At block 1340, the electronic drive intelligence software receives an instruction to park the head 110 on the load ramp 1205. The electronic drive intelligence software may park a suspension arm 1460, to which slider 1600 (and thereby head 110) is secured, on load/unload ramp 1205, for example, when the disk drive system is powering down.

At block 1350, the electronic drive intelligence software directs the positioning of the head 110 over the safe zone 20. The air pressure induced by the surface of the safe zone 20 causes the fly height 11 of the head 110 to increase to fly height 15 as it travels over the transition zone 20 from the data zone 40 to load/unload ramp 11205, as shown in FIG. 12.

At block 1360, the electronic drive intelligence software positions the head 110 over the load ramp 1205. Also, the fly height 15 of the head 110 over the safe zone 20 ensures the slider 1600 sufficiently clears the loading ramp 1205 while parking as shown in FIG. 12. At block 1370, the head 110 is parked on the loading ramp 1205.

It will be appreciated that more or fewer processes may be incorporated into the method illustrated in FIGS. 5, 11, and 13 without departing from the scope of an embodiment and that no particular order is implied by the arrangement of blocks shown and described herein. It further will be appreciated that the method described in conjunction with FIGS. 5, 11, and 13 may be embodied in machine-executable instructions, e.g. software. The instructions can be used to cause a general-purpose or special-purpose processor that is programmed with the instructions to perform the operations described. Alternatively, the operations might be performed by specific hardware components that contain hardwired logic for performing the operations, or by any combination of programmed computer components and custom hardware components.

The method may be provided as a computer program product that may include a machine-readable medium having stored thereon instructions that may be used to program a computer (or other electronic devices) to perform the method. For the purposes of this specification, the terms "machine-readable medium" shall be taken to include any medium that is capable of storing or encoding a sequence of instructions for execution by the machine and that cause the machine to perform any one of the methodologies of the present invention. The term "machine-readable medium" shall accordingly be taken to include, but not be limited to, solid-state memories, optical and magnetic disks, and a carrier wave that encodes a data signal. Furthermore, it is common in the art to speak of software, in one form or another (e.g., program, procedure, process, application, module, logic. . . ), as taking an action or causing a result. Such expressions are merely a shorthand way of saying that execution of the software by a computer causes the processor of the computer to perform an action or produce a result.

Figure 7:
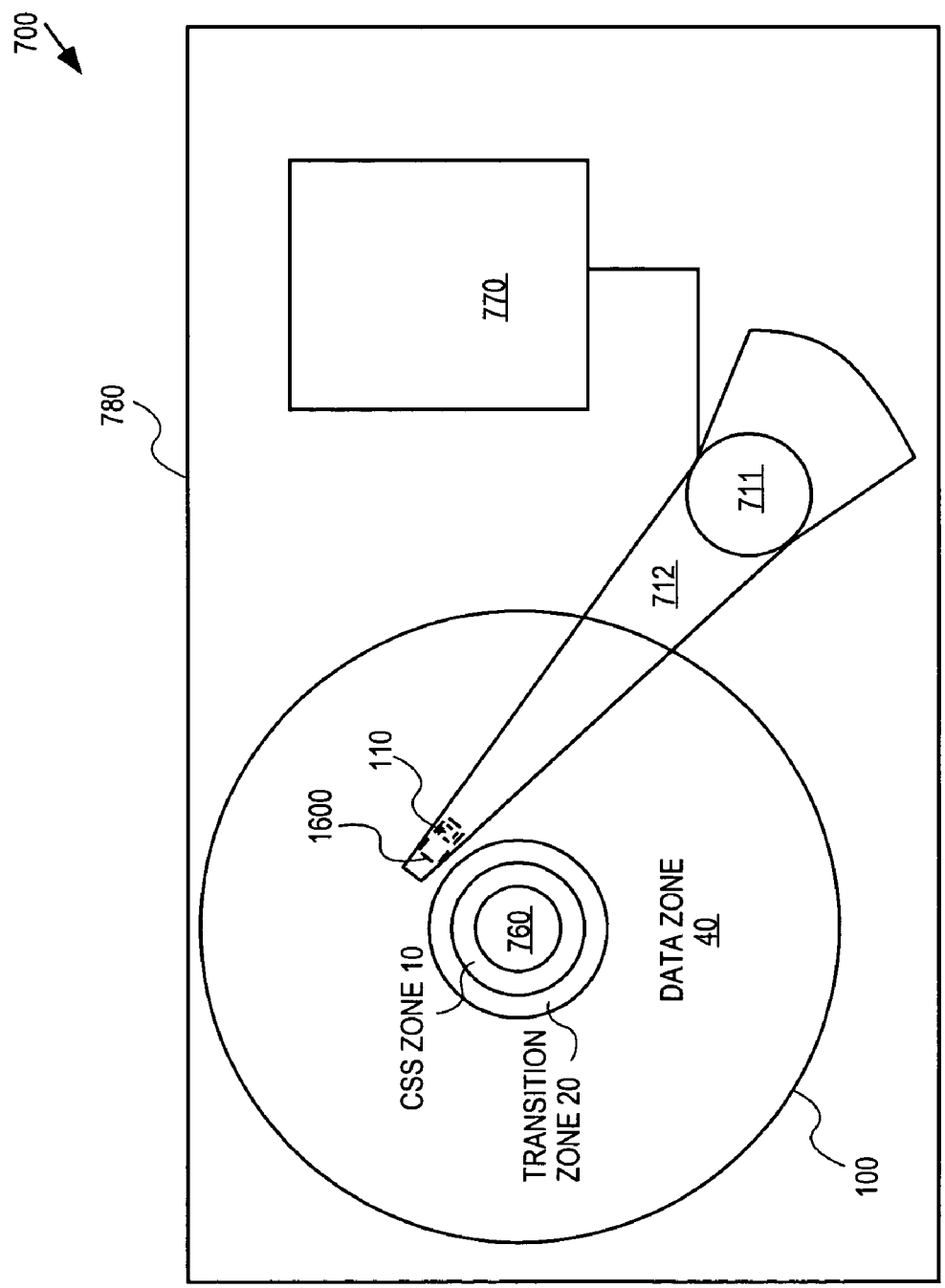
FIG. 7 illustrates one embodiment of a disk drive system.

FIG. 7 illustrates one embodiment of a CSS type disk drive system. Disk drive 700 may include one or more of disk 100 to store data. Disk 100 resides on a spindle assembly 760 that is mounted to drive housing 780. Actuator 711 is connected by a suspension arm 712 to slider 1600. The actuator 711 is connected to the drive housing 1080 and moves the suspension arm 712 and, thus head 110 in a radial direction to a desired location on the disk 100. A spindle motor (not shown) rotates spindle assembly 760 and, thereby, disk 100 to position head 110 at a particular location along a desired disk track well known to those of ordinary skill in the art. The position of head 110 relative to disk 100 may be controlled by position control circuitry 770 (e.g., the electronic drive intelligence software may be stored in the position control circuitry 770). As previously mentioned, in one embodiment, head 110 may have a magneto-resistive (MR) and, in particular, a giant magneto-resistive (GMR) read element and an inductive write element. In an alternative embodiment, head 110 may be another type of head, for examples, a Hall effect head or an inductive head having a common element for both read and write operations.

In one embodiment, disk drive 700 may be a CSS type disk drive. In such an embodiment, disk 100 has a CSS zone 10, a transition zone 20 and a data zone 40. It should also be understood that the electronic drive intelligence software could also be programmed to instruct the suspension arm 712 to increase the fly height of head 110 over disk 100.

Figure 15:
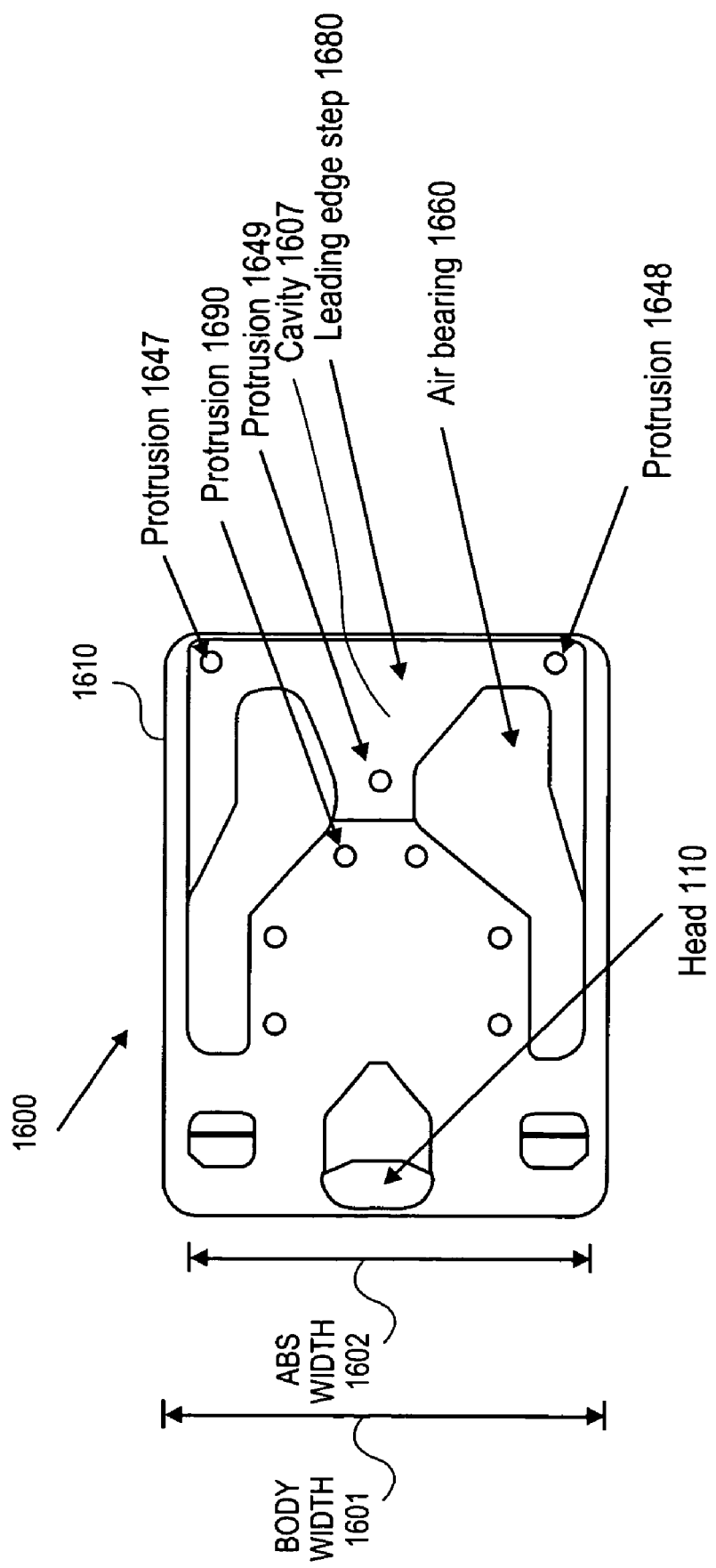
FIG. 15 illustrates one embodiment of a slider having a padded air bearing surface.

The slider 1600, having head 110 coupled thereto, may include various components and features to further reduce stiction between slider 1600 and the surface of the CSS zone 10 of disk 100, for examples, texturing, a positive crown (longitudinal curvature to the air bearing surface contour), and/or pads on the ABS of the slider (as illustrated in one embodiment in FIG. 15).

FIG. 15 illustrates one embodiment of a slider having a padded ABS. Slider 1600 may include a slider body 1610, protrusions, head 110, and air bearing surface 1660. The slider body 1600 is attached to the suspension (712 or 1460) via a head gimbal assembly that load biases the slider body 1610 towards the disk 100. The net effect of the air bearing surface 1660 and the suspension is to cause the slider 1600 to fly at a desired height above disk 100 when the disk is rotating. The air bearing surface 1660 may include one or more rails that generate a positive air pressure under slider

1600. In addition, slider 1600 may include a cavity 1607 or similar structure between the rails that creates a sub-ambient pressure to counterbalance the positive pressure generated by the suspension arm (712 or 1460), to some extent. Air bearing surfaces and rails are known in the art; accordingly, a more detailed discussion is not provided. In one embodiment, slider 1600 may include protrusions (e.g., protrusions 1647, 1648 and 1649, for example, disposed on leading edge step 1680) such as pads or a texture that may operate in conjunction with the patterned surface of the CSS zone to further reduce stiction. In one embodiment, slider 1600 may also include one or more protrusion on other sections of slider 1600, for example, protrusion 1690. These additional protrusions may be located closer to head 110, for example, to protect it from contact with the surface of disk 100. In one embodiment, a disk drive system may be configured such that the width of transition zone 20 is wider than a width of an air bearing surface of a slider (e.g., width 1602) but narrower than the width of the slider body (e.g., width 1601).

Figure 14:
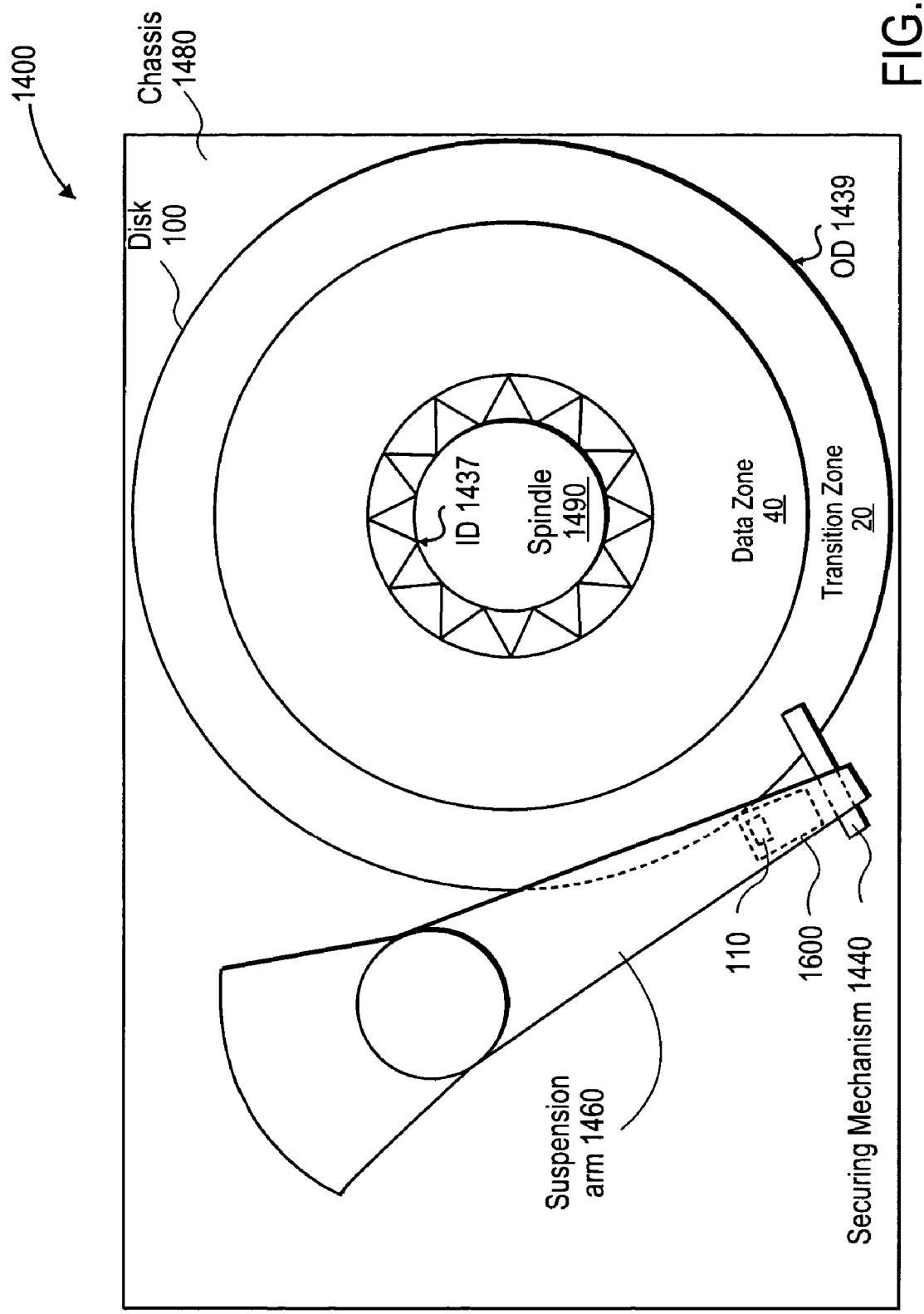
FIG. 14 illustrates a top view of one embodiment of a load/unload disk drive system.

FIG. 14 illustrates one embodiment of a load/unload disk drive system. In this embodiment, disk drive system 1400 is a load/unload disk drive system having a ramp 1205 as a securing mechanism 1440 for the suspension arm 1460. Ramp 1205 is used to secure the head 110 coupled to a slider outside the outer diameter (OD) 1439 edge of disk 100. A bottom portion of the ramp 1205 may extend over OD 1439 of the disk 100. Before startup of disk drive system 1400, head 110 is positioned on ramp 1205. During startup, the suspension arm 1460 moves the head 110 down ramp 1205 so that head 110 flies after clearing the bottom of ramp 1205. During shut down of disk drive 1400, the suspension arm 1460 moves head 110 up ramp 1205 to its parked position at the top.

In an alternative embodiment, ramp 1205 may be configured to secure head 110 inside the inner diameter (ID) 1437 edge of disk 100. The ramp 1205 may also be secured in disk drive system 1400 in various locations, for example, to the base of chassis 1480, a cover (not shown), spindle hub 1490, etc. Although the securing mechanism 1440 may be discussed herein in reference to a ramp 1208, the disk drive system 1400 is not limited to only a ramp type securing mechanism. In alternative embodiments, securing mechanism 1440 may be other types of mechanisms known in the art, for example, a pneumatic mechanism to dynamically load/unload slider 1600.

Although illustrated with only a single disk and a single side for ease of discussion, disk drive systems 700 and 1400 may include double sided disks and multiple (single sided and/or double sided) disks in which each side of a disk may have a corresponding slider and suspension arm assembly.

Figure 8:
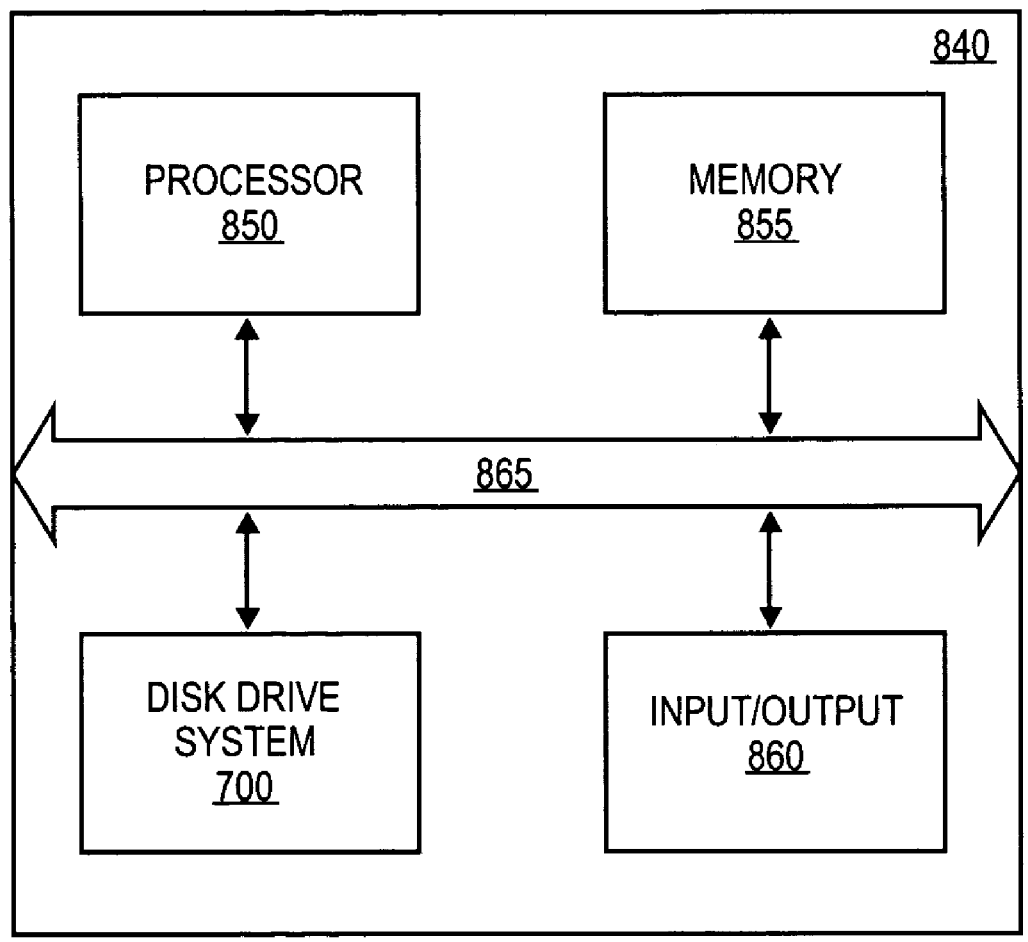
FIG. 8 illustrates one embodiment of a computer system.

The disk drive systems 700 and 1400 may be coupled to a computer system as illustrated in FIG. 8. In one embodiment, computer system 840 may include a processor 850, memory 855, a disk drive system 700/1400, and input/output capability 860 coupled to a system bus 865. The memory 855 is configured to store instructions, such as the electronic drive intelligence software, that when executed by the processor 850, perform the methods described herein. Input/output 860 allows for the transfer of data to and from the magnetic disk drive system 700/1400. In addition, Input/output 860 interface with a receiver, a transmitter, a visual display, and various types of machine-readable media, including any type of additional storage device that is accessible by the processor 850.

The description of FIG. 8 is intended to provide an overview of computer hardware and other operating components suitable for implementing the embodiments of the invention, but is not intended to limit the applicable environments. It will be appreciated that the computer system 840 is one example of many possible computer systems that have different architectures. A typical computer system will usually include at least a processor, memory, and a bus coupling the memory to the processor. One of ordinary skill in the art will immediately appreciate that embodiments of the invention can be practiced with other computer system configurations, including multiprocessor systems, minicomputers, mainframe computers, and the like.

While the invention has been described in terms of several embodiments, those skilled in the art will recognize that the invention is not limited to the embodiments described. The embodiments of the invention can be practiced with modification and alteration within the scope of the appended claims. The description is thus to be regarded as illustrative instead of limiting on the invention.

What is claimed is:

1. A magnetic recording disk, comprising:
  a first zone to store data;
  a second zone adjacent to the first zone, the second zone having a surface to increase a fly height of a head greater than when the head is operating over the first zone; and
  a third zone adjacent to the second zone in which to park the head thereabove, wherein the first zone comprises a discrete track recording (DTR) pattern.

2. The magnetic recording disk of claim 1, wherein the third zone is a load/unload zone.

3. The magnetic recording disk of claim 1, wherein the second zone has a planar surface relative to the DTR patterned surface of the first zone.

4. The magnetic recording disk of claim 3, wherein the planar surface of the second zone is substantially smooth.

5. The magnetic recording disk of claim 3, wherein the planar surface has a texture.

6. The magnetic recording disk of claim 3, wherein the planar surface of the transition zone has a texture produced through the deposition of a plurality of layers of the disk above a textured layer.

7. The magnetic recording disk of claim 6, wherein the textured layer is a textured substrate.

8. The magnetic recording disk of claim 6, wherein the textured layer is textured NiP layer.

9. A disk drive, comprising:
  a slider comprising a Hall effect head or a head having a magneto-resistance read element; and
  a magnetic recording disk comprising:
    a first zone to store data;
    a second zone adjacent to the first zone, the second zone having a surface to increase a fly height of the slider greater than when the slider is operated over the first zone; and
    a third zone adjacent to the second zone in which to park the slider thereabove, wherein the first zone comprises a discrete track recording pattern.

10. The disk drive of claim 9, wherein the third zone is a load/unload zone and wherein the slider is coupled to a suspension arm, the suspension arm configured to park the slider above the load/unload zone when the slider resides on a ramp.

11. The disk drive of claim 9, wherein the second zone has a planar surface relative to the discrete track recording pattern of the first zone.

12. The disk drive of claim 11, wherein the planar surface of the second zone has a texture produced through the deposition of a plurality of layers of the disk above a textured layer.

13. The disk drive of claim 12, wherein the textured layer is a textured substrate.

14. The disk drive of claim 12, wherein the textured layer is a textured NiP layer.

15. The disk drive of claim 9, wherein the slider further comprises a body having a first width and an air bearing having a second width, wherein the second zone has a third width being wider than the second width of the air bearing and narrower than the first width of the slider body.

16. A load/unload disk drive, comprising:
   a slider comprising a Hall effect head or a head having a magneto-resistance read element;
   a ramp; and
   a magnetic recording disk, wherein the ramp is disposed above a first portion of the magnetic recording disk, and wherein the magnetic recording disk comprises:
      a data zone having a discrete track recording pattern; and
      a load/unload zone adjacent to the data zone, wherein the load/unload zone includes the first portion residing beneath the ramp and a second portion extending beyond the ramp, the second portion of the load/unload zone having a surface to increase a fly height of a slider greater than when the slider is operating over the data zone.

17. The load/unload disk drive of claim 16, wherein the second portion of the load/unload zone has a planar surface relative to the discrete track recording pattern of the data zone.

18. The load/unload disk drive of claim 17, wherein the planar surface of the load/unload zone is substantially smooth.

19. The load/unload disk drive of claim 17, wherein the planar surface has a texture.

20. The load/unload disk drive of claim 17, wherein the planar surface of the load/unload zone has a texture produced through the deposition of a plurality of layers of the magnetic recording disk above a textured layer.

21. The load/unload disk drive of claim 20, wherein the textured layer is a textured substrate.

22. The load/unload disk drive of claim 20, wherein the textured layer is a textured NiP layer.

* * * * *

UNITED STATES PATENT AND TRADEMARK OFFICE
CERTIFICATE OF CORRECTION

| | |
|---|---|
| PATENT NO. | : 7,199,977 B2 |
| APPLICATION NO. | : 10/701059 |
| DATED | : April 3, 2007 |
| INVENTOR(S) | : Shoji Suzuki and Henry S. Nishihira |

It is certified that error appears in the above-identified patent and that said Letters Patent is hereby corrected as shown below:

In the drawings, Sheet 3, Figure 2A, the label "RAISED AREA 120" should be removed.
In the drawings, Sheet 3, Figure 2A, the reference character "167" and the associated lead line should be removed.

Column 9
Line 30, delete "In" and substitute --It--.
Line 34, between "direction" and "of" insert --18--.

Column 10
Line 52, between "method" and "of" insert --1100--.

Column 11
Line 26, between "method" and "of" insert --1300--.
Line 49, delete "11205" and substitute --1205--.

Column 12
Line 29, delete "1080" and substitute --780--.

Signed and Sealed this

Fifth Day of January, 2010

David J. Kappos
*Director of the United States Patent and Trademark Office*